United States Patent
Connor et al.

(10) Patent No.: US 9,470,271 B2
(45) Date of Patent: Oct. 18, 2016

(54) SEALING BOOT ASSEMBLY

(71) Applicant: GM GLOBAL TECHNOLOGY OPERATIONS LLC, Detroit, MI (US)

(72) Inventors: Kevin D. Connor, Grand Blanc, MI (US); Jason J. Nolte, Wixom, MI (US); Richard J. Knoll, Swartz Creek, MI (US); David M. Connor, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 14/481,171

(22) Filed: Sep. 9, 2014

(65) Prior Publication Data

US 2016/0069396 A1    Mar. 10, 2016

(51) Int. Cl.
*F16D 3/84* (2006.01)
*F16D 3/223* (2011.01)

(52) U.S. Cl.
CPC ............. *F16D 3/845* (2013.01); *F16D 3/223* (2013.01); *F16D 2003/22316* (2013.01); *F16D 2003/22326* (2013.01); *F16D 2003/846* (2013.01); *Y10T 464/10* (2015.01)

(58) Field of Classification Search
CPC  F16D 3/845; F16D 2003/846; Y10T 464/10

USPC ................. 464/17, 173–175; 277/634–636, 277/928–930; 137/799
See application file for complete search history.

(56) References Cited

U.S. PATENT DOCUMENTS

| | | | | |
|---|---|---|---|---|
| 3,403,932 A | * | 10/1968 | Kutcher ................. | F16C 11/06 277/635 X |
| 4,529,213 A | * | 7/1985 | Goodman ................. | F16F 9/38 277/928 |
| 5,472,072 A | * | 12/1995 | Bumgarner ............. | F16F 9/003 277/928 |
| 5,568,930 A | * | 10/1996 | Urbach ............... | F16C 11/0671 277/635 |
| 6,932,356 B2 | * | 8/2005 | Gloaguen ................ | F16J 3/046 277/636 |

\* cited by examiner

*Primary Examiner* — Gregory Binda
(74) *Attorney, Agent, or Firm* — Cantor Colburn LLP

(57) ABSTRACT

A sealing boot assembly comprises a flexible boot having a first end in sealing engagement with an outer surface of a shaft to define an inner chamber therein. A venting orifice extends from the inner chamber through the flexible boot to ambient and a moisture-blocking, vapor-breathable membrane is disposed across the venting orifice between the inner chamber and ambient to vent gas from the inner chamber during high temperature operation of the shaft and to allow air to returns to the inner chamber upon cooling thereof.

17 Claims, 4 Drawing Sheets

SEALING BOOT ASSEMBLY

FIELD OF THE INVENTION

The subject invention is related to dynamic joints for use in motor vehicles and, more particularly, to dynamic joint boots used therewith.

BACKGROUND

A dynamic joint communicates rotation between two parts or shafts. The longitudinal axes of the respective parts may be angled relative to one another during rotation and, while torque is being applied. A sealing boot is mounted over the dynamic joint at one end, and to a shaft at an opposite end, to seal lubricant within the joint and to exclude debris and moisture from entering the joint. Known seal boots are fixed, such as by clamping about the shaft and the dynamic joint body, to preclude relative axial movement of the shaft and boot and to prevent ingress of contaminants into the joint and egress of lubricant from the joint.

Under high power, high torque and other high performance applications that may occur in racing, towing or off-road usage, for example, the dynamic joint may experience a significant increase in temperature as a result of the power being transferred therethrough. The temperature increase of the joint will also increase the lubricant temperature and the ambient temperature within the sealing boot resulting in a pressure differential between the interior and the exterior of the boot. The increase in temperature and pressure may cause the boot to swell until the pressure acting on the interior of the boot overcomes the clamping force exerted about the shaft and/or the dynamic joint body. When the clamping forces are overcome, high pressure, high temperature gas is expelled from within the sealed boot, usually by bypassing the clamps on the shaft or dynamic joint body (catastrophic venting). Lubricant may also be expelled with the expelled gas.

Upon cooling of the joint, a negative pressure differential is created between the interior and the exterior of the sealing boot causing air to be drawing into the boot in the same manner. Contaminants and moisture may accompany the air as it is drawn into the boot resulting in durability concerns for the dynamic joint. Additionally, the expelled lubricant is not replaced which also may result in reduced durability of the dynamic joint. On the other hand, if the clamping force is high enough, air may not re-enter the boot causing it to collapse on the dynamic joint which can damage the joint during subsequent operation of the vehicle.

SUMMARY OF THE INVENTION

In an exemplary embodiment a joint assembly comprises a rotatable shaft having a first, proximal end connected to a source of rotation and a second, distal end connected to a rotatable member, a dynamic joint, disposed at the intersection of the rotatable shaft and the source of rotation, comprising an outer joint member, an inner joint member and a sealing boot assembly disposed about the dynamic joint. The sealing boot assembly comprises a flexible boot having a first end in sealing engagement with an outer surface of the outer joint member and a second end in sealing engagement with an outer surface of the first end of the rotatable shaft to define an inner chamber therein, a venting orifice extending from the inner chamber through the flexible boot to ambient, and a moisture-blocking, vapor-breathable membrane disposed across the venting orifice between the inner chamber and ambient wherein gas vents from the inner chamber during high temperature operation of the dynamic joint and air returns to the inner chamber upon cooling thereof.

In another exemplary embodiment a sealing boot assembly comprises a flexible boot having a first end in sealing engagement with an outer surface of a shaft to define an inner chamber therein, a venting orifice extending from the inner chamber through the flexible boot to ambient and a moisture-blocking, vapor-breathable membrane disposed across the venting orifice between the inner chamber and ambient wherein gas vents from the inner chamber during high temperature operation of the shaft and air returns to the inner chamber upon cooling thereof.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
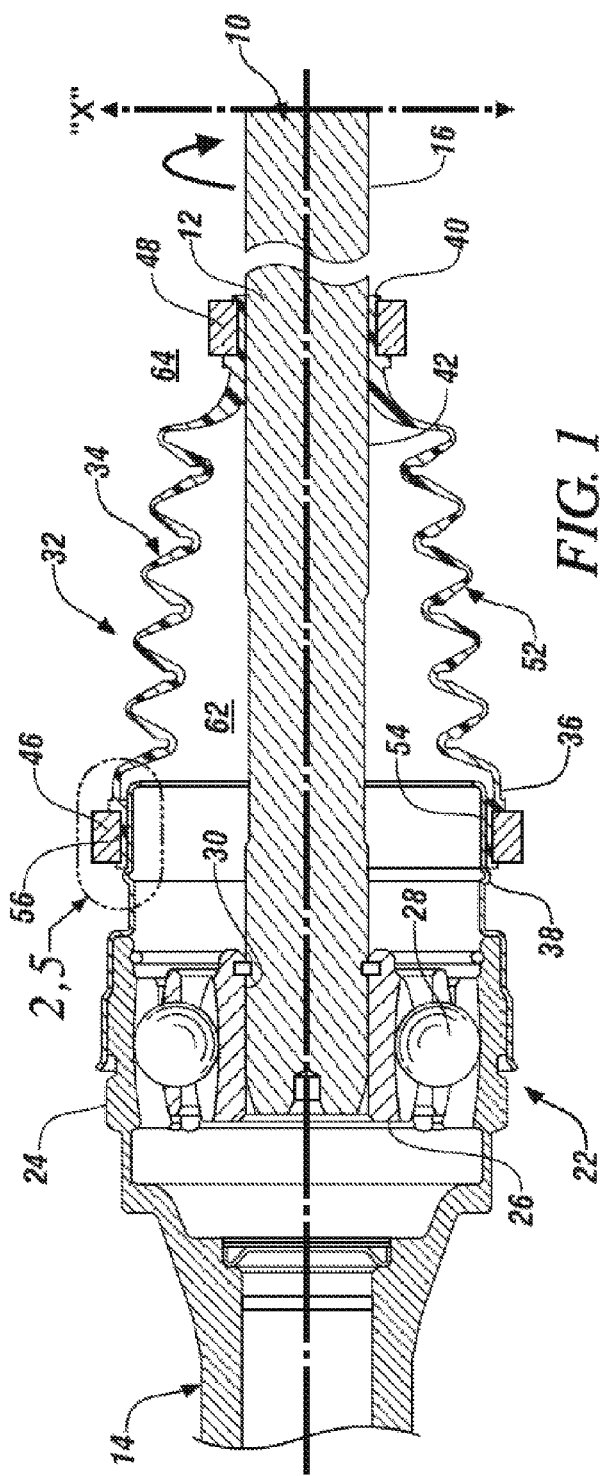
FIG. 1 is a partial cross-sectional view of a dynamic joint having a sealing boot assembly embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a burden.

Referring to FIG. 1, in an exemplary embodiment, a shaft assembly comprising a rotatable shaft such as a half shaft or propshaft 10 for a machine or motor vehicle (not shown) has a first, proximal end 12 connected to a source of rotation such as a transmission output shaft 14 and a second, distal end 16 connected to a rotatable member such as a wheel and tire hub (not shown) that may be configured to move in a radial direction as shown by the arrows "X". To facilitate rotation of the propshaft 10 as well as radial movement as illustrated, a dynamic joint 22 is disposed at the intersection with the output shaft 14. The dynamic joint includes an outer joint member 24 and an inner joint member 26. A plurality of rollers or torque transmitting ball bearings 28 is disposed between the outer and inner joint members 24, 26. Rotation or one of the joint members 24, 26 is communicated to the other joint member by ball bearings 28. Propshaft 10 is engaged with inner joint member 26 through insertion in aperture 30 of the inner joint member. The engagement between the propshaft 10 and the inner joint member 26, as well as the engagement between the inner joint member 26 and the outer joint member 24, is enhanced by lubricant. In operation, the temperature of the lubricant can increase in response to the angular velocity of the rotating parts.

The dynamic joint 22 includes a sealing boot assembly 32 to prevent lubricant from evacuating the joint as well as preventing contamination from entering. The sealing boot assembly 32 includes a flexible boot 34 having a first end 36 in sealing engagement with an outer surface 38 of the outer joint member 24 and a second end 40 in sealing engagement with an outer surface 42 of the first end 12 of propshaft 10. In an exemplary embodiment, a band clamp 46 compresses the first end 36 of the flexible boot with respect to the outer joint member 24 and a similar band clamp 48 can compress the second end 40 of the flexible boot 34 with the first end 12 of the propshaft 10. The flexible boot 34 may include a convoluted portion 52 between the first end 36 and the second end 40.

Figure 2:
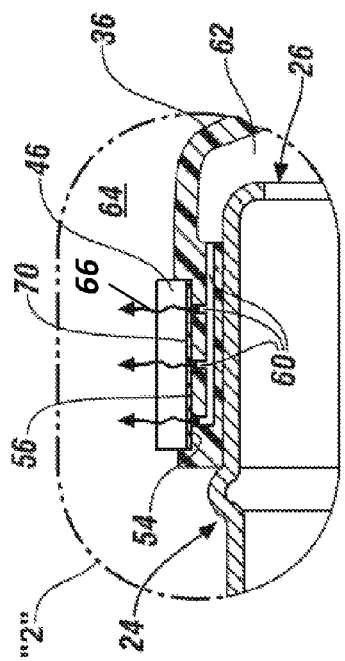
FIG. 2 is an enlarged view of a portion of the assembly illustrated in FIG. 1 taken at Circle 2.
Figure 3:
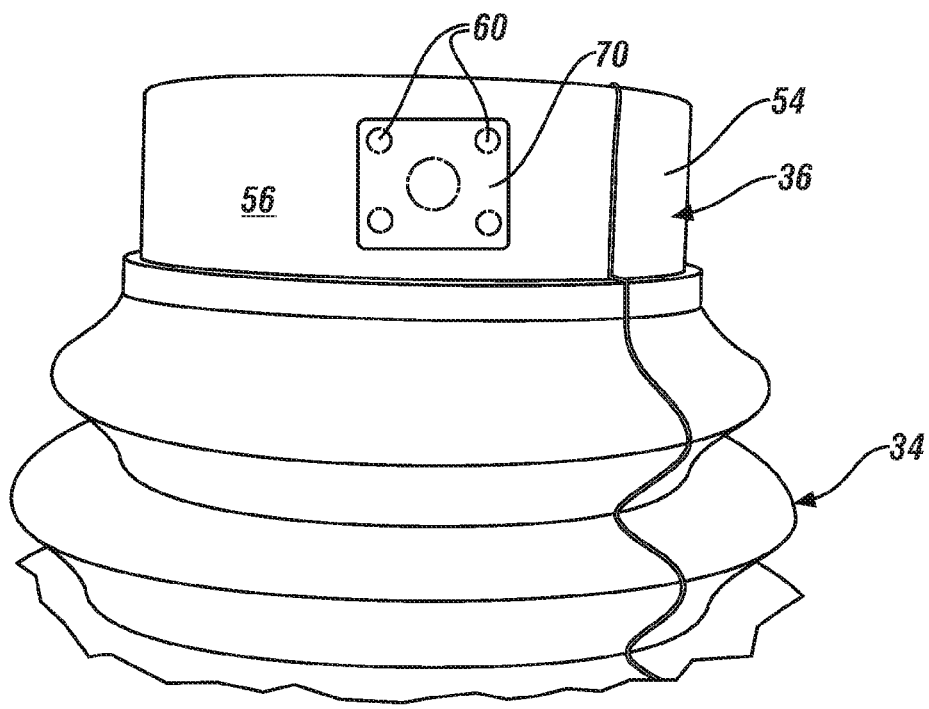
FIG. 3 is an end view of a flexible boot of the sealing boot assembly embodying features of the invention.
Figure 4:
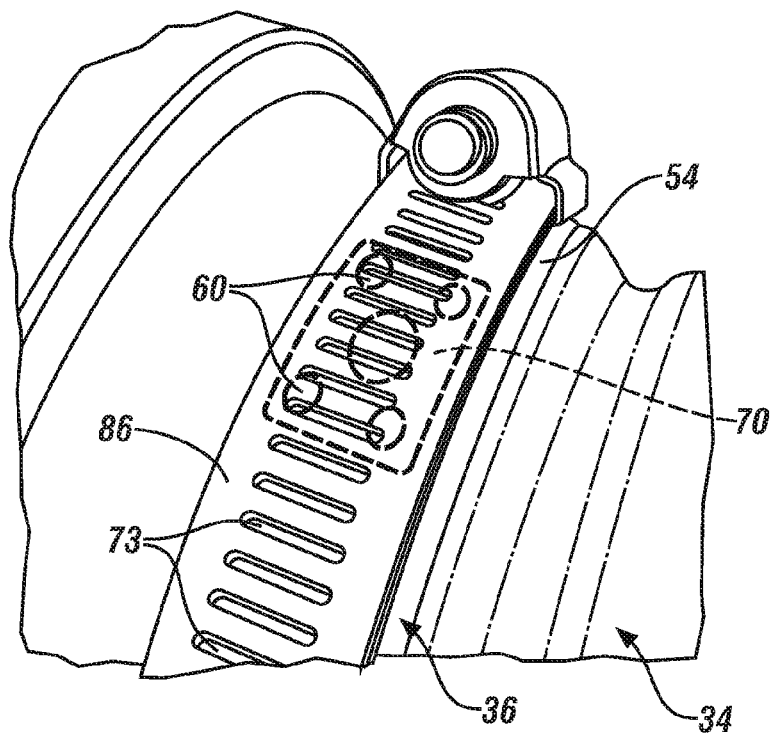
FIG. 4 is an end view of a flexible boot and clamp of the sealing boot assembly embodying features of the invention.

Referring now to FIGS. 2-4 with continuing reference to FIG. 1, in an exemplary embodiment, the first end 36 of the flexible boot 34 may include a seating portion 54 extending thereabout. The seating portion provides a platform 56 upon which band clamp 46 is positioned. Venting orifice or orifices 60 extend from the inner chamber 62 defined by the sealing boot assembly 32 through the seating portion 54 of the first end 36 and to ambient 64. It is through the venting orifices that hot gas 66 is released from the inner chamber 62 during high temperature, high performance operation of the dynamic joint 22. In one exemplary embodiment, a moisture-blocking, vapor-breathable membrane 70 is disposed at the interface between the platform 56 of the seating portion 54 and the band clamp 46. The band clamp may be configured as illustrated in FIG. 4, with slots 73 or other perforations which will allow the hot gas 66 to pas from the venting orifices 60 through the moisture-blocking, vapor-breathable membrane 70 and to ambient 64. Upon cooling of the dynamic joint, the membrane 70 allows only air to return to the inner chamber 62 thereby preventing the flexible boot from collapsing on the dynamic joint 22 without allowing moisture and other debris from entering the joint. In addition, by venting the hot gas 66 as the temperature in the inner chamber 62 rises, catastrophic venting is avoided which can cause expulsion of lubricant from the dynamic joint 22.

As described, the dynamic joint 22 and sealing boot assembly 32 is well suited to OEM manufacturing as the venting orifices 60 may be molded or machined into the elastomeric flexible boot 34 during manufacture. The dynamic joint 22 and sealing boot assembly 32 is also well suited to after-market applications as the venting orifices 60 may be drilled, punched or otherwise formed in the flexible boot 34 and the moisture-proof/breathable membrane 70 may then be placed over the orifices, for example. In addition, the moisture-blocking, vapor-breathable membrane 70 may be placed over single or multiple venting orifices 60. In embodiments, the membrane 70 can be secured between the boot and the clamp, as described, molded into the boot material, adhered to or welded to the boot material. Moreover, the membrane may be secured between the inner chamber 62 and ambient in any manner that enables the system to function as described herein.

Figure 5:
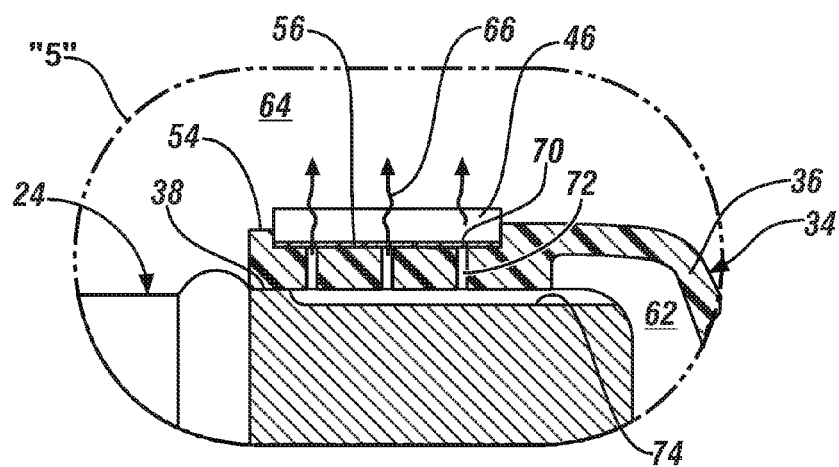
FIG. 5 is an enlarged view of a portion of the assembly illustrated in FIG. 1 taken at Circle 5 illustrating another embodiment of the invention.

Referring to FIG. 5, with continuing reference to FIG. 1, in another exemplary embodiment the first end 36 of the flexible boot 34 may include a seating portion 54 extending thereabout. The seating portion provides a platform 56 upon which band clamp 46 is positioned. Boot venting orifice or orifices 72 extend through the seating portion 54 of the sealing boot assembly 32 to ambient 64. A venting channel (or channels) 74 is formed in the outer surface 38 of the outer joint member 24. The venting channels 74 correspond circumferentially with the boot venting orifices 72. It is through the combination of the boot venting orifices 72 and the venting channels 74 that hot gas 66 is released from the inner chamber 62 during high temperature (high performance) operation of the dynamic joint 22. In one exemplary embodiment, a moisture-blocking, vapor-breathable membrane 70 is disposed at the interface between the platform 56 of the seating portion 54 and the band clamp 46. The band clamp may be configured as illustrated in FIG. 4, with slots 73 or other perforations which will allow the hot gas 66 to pas from the venting orifices 60 through the moisture-blocking, vapor-breathable membrane 70 and to ambient 64. However, upon cooling of the dynamic joint, the membrane 70 allows only air to return to the inner chamber 62 thereby preventing the flexible boot from collapsing on the dynamic joint 22 without allowing moisture and other debris from entering the joint. In addition, by venting the hot gas 66 as the temperature in the inner chamber 62 rises, catastrophic venting is avoided which can cause expulsion of lubricant from the dynamic joint 22.

Figure 6:
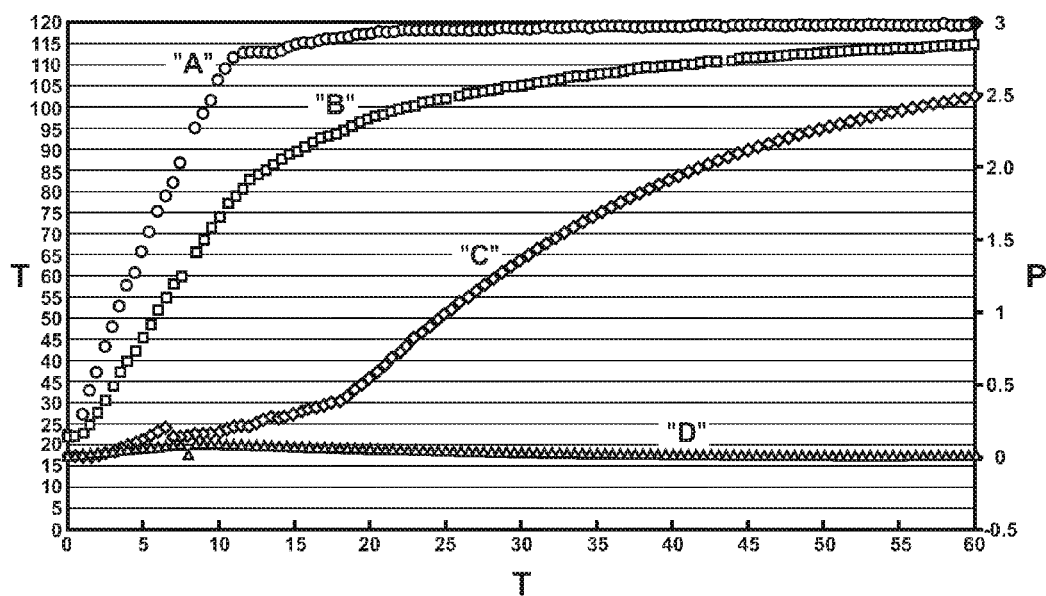
FIG. 6 is a graph illustrating performance features of the invention.

Performance of a dynamic joint having a sealing boot assembly that includes features of the invention can be understood by reference to the chart in FIG. 6, where Time is represented on the x-axis and Temperature and Pressure are represented on the y-axis. In the example, temperature of an oven is illustrated by trace "A" and exterior boot temperature is represented by trace "B". A dynamic joint having a sealing boot assembly without the addition of features of the invention has an internal pressure represented by trace "C" while the dynamic sealing joint having the addition of features of the invention shows an internal pressure represented by trace "D".

It should be noted that for illustrative purposed, the venting orifices 60, 72 and the venting channels 74 have been shown simplistically in the Figures. However, it is contemplated that both the venting channels and the venting orifices are subject to various shapes and configurations (ex. torturous paths for instance) that may aid in reducing the chance of debris entrance into the flexible boot. Additionally, although the above description has utilized a dynamic joint of the constant velocity type, it is contemplated that any type and nature of joint that requires sealing protection using a device such as the flexible boot 34 is subject to the application of the invention disclosed herein.

Figure 7:
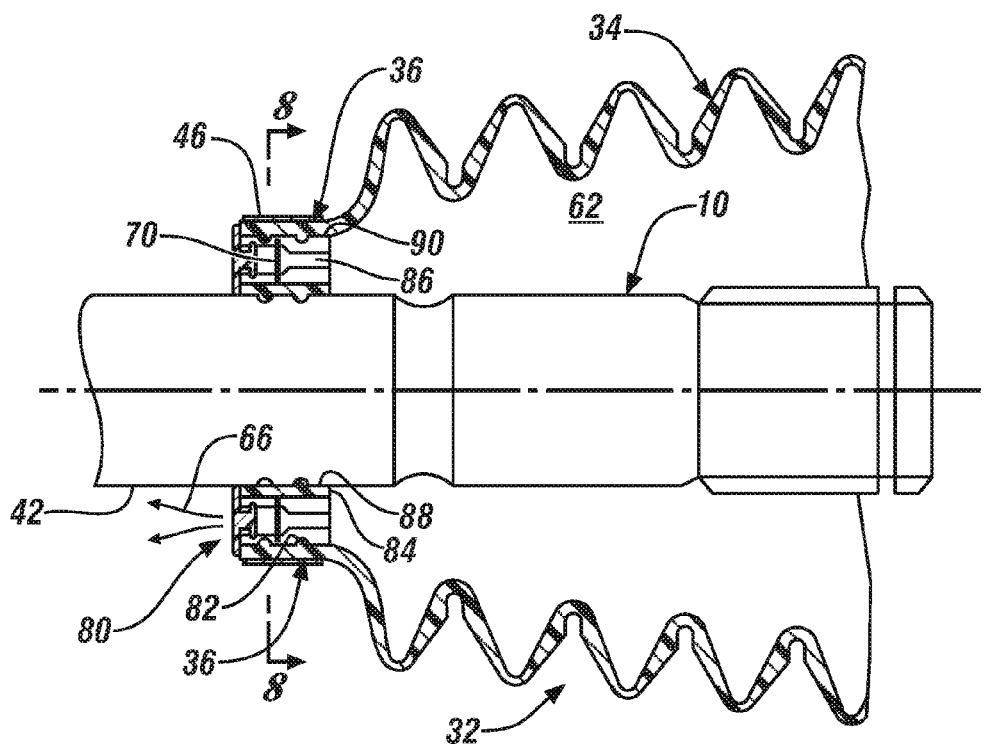
FIG. 7 is a partial cross-sectional view of an additional embodiment of a dynamic joint having a sealing boot assembly embodying features of the invention.
Figure 8:
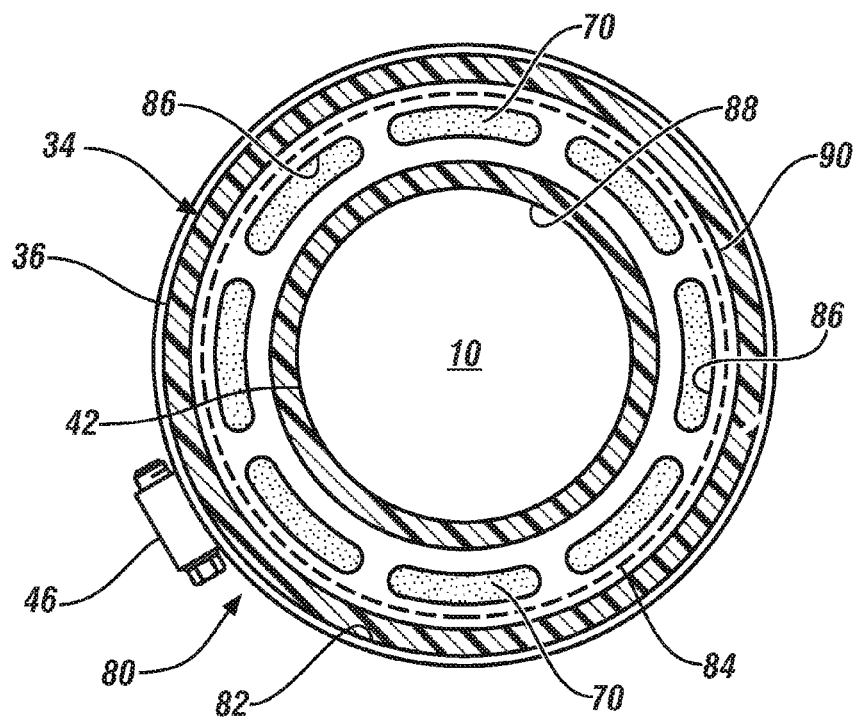
FIG. 8 is a sectional view, taken along line 8-8 of FIG. 7.

The embodiments described thus far have included venting orifices that are integrally formed in the flexible boot 34 of the sealing boot assembly 32. In some instances it may not be desirable or possible to locate the venting orifices in the flexible boot 34 and, as such, in an exemplary embodiment, it may be desirable to provide a separate venting assembly 80, as illustrated in FIGS. 7 and 8. In the embodiment of FIGS. 7 and 8 the sealing boot assembly 32 includes a flexible boot 34 having a first end 36 that closes around the outer surface 42 of a propshaft 10, for example. Disposed between the inner circumference 82 of the first end 36 and the outer surface 42 of the propshaft 10 is the separate venting assembly 80. The separate venting assembly, in the embodiment illustrated, comprises a disc member 84 having ports or passages 86 extending axially therethrough. The disc member 84 includes an opening 88 for mounting the member on the propshaft 10. In an exemplary embodiment the opening 88 is sized to define an interference fit when the disc member is placed in sliding engagement with the end of the propshaft 10 such that a seal is defined therebetween. An outer surface 90 of the disc member 84 defines a seating portion upon which the first end 36 of the flexible boot is located in sealing engagement. In an exemplary embodiment, a band clamp 46 compresses the first end 36 of the flexible boot with respect to the outer joint member 24 and a similar band clamp 48 can compress a second end 40 of the flexible boot 34 with the first end 12 of the propshaft 10. In an exemplary embodiment, a band clamp 46 compresses the first end 36 of the flexible boot with respect to the first end 36 of the flexible boot flexible boot and the propshaft 10. A moisture-blocking, vapor-breathable membrane 70 is positioned across the passages 86 in the disc member 84. The membrane may be positioned at an end of the disc (i.e. inner or outer) such that it may be removable and/or replaceable or it may be formed in the disc as illustrated in FIG. 7. As described herein, it is through the passages 86 that hot gas 66 is released from the inner chamber 62 during high temperature (high performance) operation to ambient. Upon cooling of the dynamic joint, the membrane 70 allows only air to return to the inner chamber 62 thereby preventing the flexible boot from collapsing without allowing moisture and other debris from entering the boot. In addition, by venting the hot gas 66 as the temperature in the inner chamber 62 rises, catastrophic venting is avoided which can cause expulsion of lubricant therefrom.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A sealing boot assembly comprises:
   a flexible boot having a first end in sealing engagement with an outer surface of a shaft to define an inner chamber therein, the first end including a seating portion extending thereabout;
   a venting orifice extending from the inner chamber through the seating portion of the flexible boot to ambient; and
   a moisture-blocking, vapor-breathable membrane disposed across the venting orifice between the inner chamber and ambient wherein gas vents from the inner chamber during high temperature operation of the shaft and air returns to the inner chamber upon cooling thereof.

2. The sealing boot assembly of claim 1, further comprising:
   a clamping member positioned about the seating portion having through-passages that allow gas to pass from the venting orifices through and to ambient.

3. The sealing boot assembly of claim 2, wherein the moisture-blocking, vapor-breathable membrane is disposed between the seating portion and the clamping member.

4. The sealing boot assembly of claim 2, wherein the venting orifice extends from the inner chamber through the seating portion and to ambient.

5. The sealing boot assembly of claim 4, further comprising:
   a venting channel formed in the outer surface of the shaft and corresponding circumferentially with the venting orifices extending from the inner chamber through the seating portion and to ambient.

6. The joint assembly of claim 5, wherein the venting channel comprises a torturous path.

7. The sealing boot assembly of claim 1, wherein the moisture-blocking, vapor-breathable membrane is molded into the flexible boot.

8. The sealing boot assembly of claim 1, wherein the moisture-blocking, vapor-breathable membrane is fixed to the flexible boot.

9. A joint assembly comprises:
   a rotatable shaft having a first, proximal end connected to a source of rotation and a second, distal end connected to a rotatable member;
   a dynamic joint, disposed at the intersection of the rotatable shaft and the source of rotation, comprising an outer joint member, an inner joint member and a sealing boot assembly disposed about the dynamic joint; the sealing boot assembly comprising:
   a flexible boot having a first end that includes a seating portion extending about the first end of the flexible boot in sealing engagement with an outer surface of the outer joint member and a second end in sealing engagement with an outer surface of the first end of the rotatable shaft to define an inner chamber therein;
   a venting orifice extending from the inner chamber through the seating portion of the flexible boot to ambient;
   a clamping member positioned about the seating portion having through-passages that allow gas to pass from the venting orifice through and to ambient; and
   a moisture-blocking, vapor-breathable membrane disposed across the venting orifice between the inner chamber and ambient wherein gas vents from the inner chamber during high temperature operation of the dynamic joint and air returns to the inner chamber upon cooling thereof.

10. The joint assembly of claim 9, wherein the moisture-blocking, vapor-breathable membrane is disposed between the seating portion and the clamping member.

11. The joint assembly of claim 9, wherein the moisture-blocking, vapor-breathable membrane is adhered to the flexible boot.

12. The joint assembly of claim 9, wherein the moisture-blocking, vapor-breathable membrane is fixed to the flexible boot.

13. The joint assembly of claim 9, wherein the venting orifice extends from the inner chamber through the seating portion and to ambient.

14. The joint assembly of claim 13, further comprising:
   a venting channel formed in the outer surface of the outer joint member and corresponding circumferentially with the venting orifices extending from the inner chamber through the seating portion and to ambient.

15. The joint assembly of claim 14, wherein the venting channel comprises a torturous path.

16. The joint assembly of claim 13, further comprising:
   a venting channel formed in the outer surface of the first end of the rotatable shaft and corresponding circumferentially with the venting orifices extending from the inner chamber through the seating portion and to ambient.

17. The joint assembly of claim 16, wherein the venting channel comprises a torturous path.

\* \* \* \* \*